(12) United States Patent
Emmanuel et al.

(10) Patent No.: US 11,483,619 B1
(45) Date of Patent: Oct. 25, 2022

(54) MEASURING SLEEP STATE OF A USER USING WEARABLES AND DECIDING ON THE PLAYBACK OPTION FOR THE CONTENT CONSUMED

(71) Applicant: Rovi Guides, Inc., San Jose, CA (US)

(72) Inventors: Daina Emmanuel, Bangalore (IN); Padmassri Chandrashekar, Karnataka (IN); Reda Harb, Bellevue, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/462,672

(22) Filed: Aug. 31, 2021

(51) Int. Cl.
*H04N 21/442* (2011.01)
*H04N 21/845* (2011.01)
*H04N 21/45* (2011.01)
*H04N 21/81* (2011.01)

(52) U.S. Cl.
CPC ... *H04N 21/44218* (2013.01); *H04N 21/4532* (2013.01); *H04N 21/812* (2013.01); *H04N 21/8455* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,207,947 B2 | 4/2007 | Koh et al. | |
| 9,436,279 B2* | 9/2016 | Beaty | H04N 21/4131 |
| 9,665,169 B1 | 5/2017 | Dai et al. | |
| 10,762,928 B1 | 9/2020 | Camus et al. | |
| 10,772,539 B2 | 9/2020 | Arnold et al. | |
| 2005/0042589 A1 | 2/2005 | Hatlestad et al. | |
| 2005/0209512 A1 | 9/2005 | Heruth et al. | |
| 2011/0314502 A1* | 12/2011 | Levy | H04N 21/4532 725/46 |
| 2014/0020017 A1* | 1/2014 | Stern | H04N 21/64322 725/34 |
| 2015/0033266 A1* | 1/2015 | Klappert | H04N 21/4314 725/52 |
| 2015/0258301 A1* | 9/2015 | Trivedi | A61B 5/0024 600/28 |
| 2015/0264432 A1* | 9/2015 | Cheng | H04N 21/44218 725/10 |
| 2016/0088334 A1 | 3/2016 | Chakarapani | |
| 2016/0089028 A1 | 3/2016 | Chatterjee et al. | |
| 2016/0301974 A1* | 10/2016 | Hough | H04N 21/25891 |
| 2017/0182283 A1* | 6/2017 | Palmateer | A61B 5/4812 |
| 2017/0336955 A1* | 11/2017 | Cho | H04N 21/4402 |
| 2019/0090030 A1 | 3/2019 | Bhuyan et al. | |

(Continued)

OTHER PUBLICATIONS

Ehatisham-Ul-Haq Muhammad, et al., "Procedia Computer Science", Identifying Users with Wearable Sensors based on Activity Patterns, Nov. 2020, 8 pages.

(Continued)

*Primary Examiner* — Alexander Q Huerta
(74) *Attorney, Agent, or Firm* — Haley Guiliano LLP

(57) ABSTRACT

Systems and methods are provided for responding to a sleep-state event. One example method includes receiving and generating, at a computing device, media content for output and receiving a sleep-state event. A type of the content being generated for output is identified and, based on the type of content, an action to perform in response to receiving the sleep-state event is identified. The action to perform is generated.

18 Claims, 16 Drawing Sheets

(56) References Cited

U.S. PATENT DOCUMENTS

| | | |
|---|---|---|
| 2019/0394528 A1* | 12/2019 | Lau .................... H04N 21/8355 |
| 2020/0192558 A1* | 6/2020 | Chase ................... G06F 3/0482 |
| 2020/0302478 A1* | 9/2020 | Martinez ............ G06Q 30/0255 |
| 2020/0344541 A1 | 10/2020 | Pergament et al. |
| 2021/0136447 A1 | 5/2021 | Daw et al. |

OTHER PUBLICATIONS

Ashkari Cashmere, How Do Wearables Track Sleep? https://www.news-medical.net/health/How-Do-Wearables-Track-Sleep.aspx, Feb. 26, 2019, 4 pages.

ISR and Written Opinion of PCT Application No. PCT/US2021/063864 dated Aug. 30, 2022.

\* cited by examiner

1400

```
1    Function SleepState
2        If SleepState = True          1402
3            Return
4                SleepState.User       1404
5                SleepState.Time       1406
6                SleepState.Duration   1408
7                SleepState.Stage      1410
8                SleepState.Location   1412
9        End If
10   End
```

FIG. 14

MEASURING SLEEP STATE OF A USER USING WEARABLES AND DECIDING ON THE PLAYBACK OPTION FOR THE CONTENT CONSUMED

BACKGROUND

The present disclosure is directed towards systems and methods for responding to a sleep-state event. In particular, systems and methods are provided herein that enable the generation of an action to perform, based on a type of media content being received at a computing device, in response to receiving a sleep-state event.

SUMMARY

The proliferation of over-the-top (OTT) media providers, such as Netflix, Amazon Prime Video, Hulu and Disney+, has enabled media content, such as episodic media content, to be delivered in ways that differ from traditional broadcasters. Whereas a traditional broadcaster may broadcast a new episode of a series on a weekly basis, during a regular timeslot, an OTT media provider may make all the episodes of a series available to stream at the same time. This, in turn, has led to a change in how viewers consume media content. For example, a viewer who has access to the series "Line of Duty" on an OTT platform may consume multiple episodes of the series one after the other. An OTT platform may aid a user with this viewing habit by the automatically streaming the next episode in a series, without input from a viewer. However, some viewers may tend to nap and/or fall asleep if they start watching an episode of a series later in the evening. For example, a viewer may watch two episodes of the series "Line of Duty" but fall asleep during the third episode. An OTT platform may continue to stream the episode and automatically stream one or more subsequent episodes, even though the viewer is no longer viewing the media content since they have fallen asleep. Some OTT platforms may automatically stop streaming media content after no input has been detected from a viewer for an extended period of time, for example, if three episodes are streamed without any input from a user. An OTT platform may associate a "resume" point (i.e., the point at which the OTT platform starts streaming the media content when a user returns to watch the series at a later time) based on the point at which the media content was automatically stopped. However, the "resume" point may not be of use to the user as they may have missed a substantial part of the series due to it being streamed while they were asleep, and it may be time-consuming for a viewer to establish the point at which they should resume the series in order to view the part of the media content that was streaming when they were asleep. A viewer streaming a film may suffer from a similar issue if they fall asleep halfway through the film and the OTT platform streams the rest of the film while they are sleeping.

In view of the foregoing, it would be beneficial to have system that is capable of responding to a sleep-state event. More specifically, systems and methods are provided herein that enable the generation of an action to perform, based on a type of media content being received at a computing device, in response to receiving a sleep-state event.

Systems and methods are described herein for responding to a sleep-state event. In accordance with a first aspect of the disclosure, a method is provided for responding to a sleep-state event. The method includes receiving media content and generating the media content for output at a computing device. A sleep-state event is received. A type of the content being generated for output is identified. An action to perform in response to receiving the sleep-state event is identified based on the type of media content, and the action to perform is generated. The type of content may be, for example, content that a user has indicated is favorite content. The user may indicate this by selecting, for example, a star icon associated with the content via, for example, a remote control of a smart television. In an example system, a viewer may open an application associated with an OTT platform on their smart television. The viewer may select an episode of Line of Duty to stream. The selected episode of Line of Duty may be streamed to the smart television via the internet from, for example, a server. The smart television may generate the received episode of Line of Duty for display. As the user is watching the selected episode of Line of Duty, they may fall asleep, which may cause a smartwatch that they are wearing to generate a sleep-state event. This sleep-state event may be transmitted from the smartwatch to the smart television via, for example, a home Wi-Fi network. On receiving the sleep-state event, an application running on the smart television may identify the type of content being consumed and identify an action to perform. An application running on the smart television may generate the identified action to perform.

A bookmark may be generated in response to receiving the sleep-state event. For example, an OTT system may generate a bookmark indicating a current episode and a time stamp indicating a progress through a current episode on receiving a sleep-state event. A user profile may be identified, and a viewing history associated with the identified user profile may be updated to indicate a resume point based on the generated bookmark. For example, an OTT system may store the generated bookmark with a user profile. When a user logs on with the same user profile and accesses the series for which a bookmark was stored, the user may be presented with an option to resume viewing an episode of the series, wherein the point at which the episode is resumed is based on the previously generated bookmark. In this way, if a user falls asleep while viewing an episode, they may easily resume watching the episode at a later time at the point at which they fell asleep. The media content may comprise metadata indicating a priority segment, and the action to perform may further comprise identifying whether the generated bookmark occurs at or before the priority segment, wherein the resume point is further based on a time stamp of the priority segment. For example, an episode of a series may comprise one or more events that are key to understanding future episodes, such as the death of a key character. Metadata indicating a start time and an end time of a segment corresponding to a key event may be transmitted to the computing devices with the episode. On receiving the sleep-state event, an application running on the computing device may identify whether the sleep-state event corresponds with the priority segment. If the sleep-state event is generated during the priority segment, then the resume point may, for example, be based on a start time of the priority segment. In this way, the user is able to recap an important part of the episode when they resume watching the episode at a later time.

The media content may be an episode of a series of episodes, and the action to perform may comprise disabling the automatic playing of a subsequent episode of the series of episodes. For example, if a sleep-state event is received at a computing device, then the application associated with the OTT platform may stop streaming any subsequent episodes of the series.

The sleep-state event may comprise data indicating a sleep stage of a user, and the action to perform may be based on the sleep stage of the user. For example, the sleep-state event may indicate if a user is in a sleep stage comprising light sleep or a deep sleep. In another example, the sleep-state event may indicate whether a user is in a sleep stage comprising rapid eye movement (REM) sleep or non-REM sleep. The sleep-state event may indicate what sleep stage of non-REM sleep a user is in, for example stage 1, stage 2 or stage 3. In another example, the sleep-state event may indicate whether a user is in sleep stage corresponding with N1, N2, N3 or slow-wave sleep, delta sleep and/or deep sleep. Different actions to perform may be generated based on whether a sleep-event indicates that a user is in a light sleep or a deep sleep. For example, if a user is in a light sleep, the media content may be changed to music that aids sleep. In another example, if the user is in a deep sleep, the computing device may be turned off or switched to a standby mode.

The media content may be first media content, and it may be determined whether the first media content comprises one or more advertisements. It may be determined whether a sleep period that starts with the received sleep-state event coincides with one or more of the advertisements. The action to perform may comprise transmitting data to an advertisement server indicating that the sleep period coincided with one or more of the advertisements. Second media content and one or more of the advertisements that coincided with the sleep period may be received at the computing device. The second media content and the one or more advertisements may be generated for output. For example, if ads are shown during an episode and a sleep-event indicates that a user has fallen asleep and hence misses the ads, this may be communicated to an advertising server via, for example, the internet. When a user watches media content at a subsequent time, the ads that the user did not watch because they were asleep may be displayed to the user during the subsequent watching of media content.

Receiving the sleep-event may comprise receiving a first sleep-event or receiving a second sleep-event, wherein the first sleep-event is associated with a first user and the second sleep-event is associated with a second user. Based on whether the sleep-event was received from the first user or the second user, a user profile associated with the first user or the second user may be identified. The action to perform may comprise generating a bookmark in response to receiving the sleep-state event and updating a viewing history associated with the identified user profile to indicate a resume point based on the generated bookmark. In an example, two users may be viewing an episode on a smart television. One of the users (for example, the second user) may fall asleep, and the second user's smartwatch may generate a sleep-event that is transmitted to the smart television. The sleep-event may indicate that the second user is associated with the sleep-event. On receiving the sleep-event, an application running on the smart television may access a profile associated with the second user and may store a bookmark with a user profile associated with the second user. When the profile associated with the second user is accessed at a later time and the series for which a bookmark was stored is accessed, the user may be presented with an option to resume viewing an episode of the series, wherein the point at which the episode is resumed is based on the previously generated bookmark. However, a different resume point may be stored with a user profile associated with the first user, for example if they did not fall asleep and finished the episode that both users were watching. In this way, if a first user does not fall asleep and a second user falls asleep while viewing an episode then each user may easily resume watching the episode at a later time at a point that is relevant to them.

The media content may be live media content that is received in, at least substantially, real time. The action to perform may comprise generating a bookmark in response to receiving the sleep-state event. A user profile may be identified, and a bookmark may be associated with the user profile. It may be identified that the live media content subsequently becomes available to stream in a video-on-demand format. An indication that the media content is available to stream in a video-on-demand format may be generated for output, wherein the indication may comprise a start point of the video-on-demand media content based on the bookmark. For example, a user may fall asleep and generate a sleep-event during a live soccer match, and a bookmark may be generated based on when the sleep-event is received and stored in a user profile. If the live soccer match is subsequently made available on demand, then a notification may be displayed when the user profile is next accessed. The notification may indicate that the previously live content is now available on demand, and a user may be able to select an option that enables them to access the content. In addition, the point at which the on-demand content plays may be based on a bookmark that was generated when the sleep-event was received during the previously live event. For example, if a sleep-event was generated at a halftime point of the live soccer match, then the on-demand content may resume at the halftime point.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 14 shows pseudocode indicating the types of data that may be included in a sleep-state event, in accordance with some embodiments of the disclosure;

DETAILED DESCRIPTION

Figure 1:
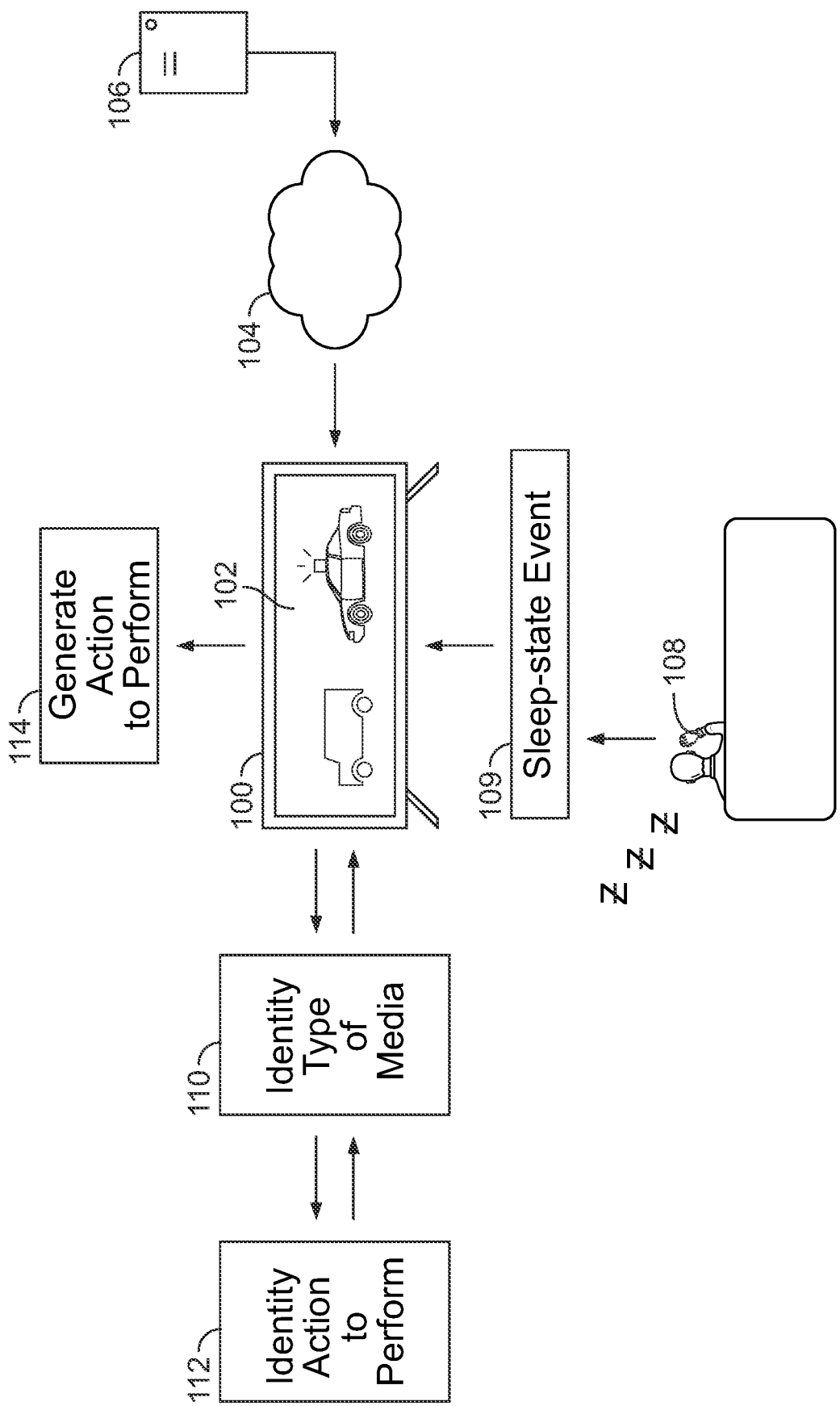
FIG. 1 shows an example environment in which a sleep-state event is received and responded to, in accordance with some embodiments of the disclosure.

Systems and methods are described herein for responding to a sleep-state event. A sleep-state event can comprise any data that is generated at a computing device that can be used to detecting whether a user has fallen asleep, is dozing and/or has entered a state of reduced consciousness or awareness. In some examples, the sleep-state event explicitly indicates that a user is dozing and/or has fallen asleep, for example by setting a flag. In other examples, the sleep-state event may comprise biometric data, for example, heart rate data, that can be processed by another computing device to infer that a user has started dozing and/or sleeping. In an example, an application running on a smartwatch may detect that a user has fallen asleep and, in response to detecting this, may send data indicating that the user has fallen asleep to a smart television. In a second example, a smart television may comprise a monitoring device, such as a camera, which is used to detect whether a user has fallen asleep. An application running on the smart television may generate a sleep-state event in response to detecting that the user has fallen asleep and may send a sleep-state event to another memory location on the smart television and/or another application running on the smart television.

Media content includes audio, video and/or any other media content. Audio includes audio-only content, such as podcasts, stories and music. Video includes audiovisual content such as movies and/or television programs. An over-the-top content platform may be accessed via a website and/or an app running on a computing device and may receive any type of media content, including live media content and/or on-demand media content. Although the embodiments below may discuss receiving media content from a server, via a network such as the internet, media content may also be received via cable, satellite and/or a terrestrial broadcasting network.

Identifying a type of content may comprise identifying whether the content has been favorited, in which case the type would be "favorited." In another example, identifying a type of content may be identifying whether the content is audiovisual or audio-only content. It may also comprise identifying whether audio-only content is a podcast, an audiobook or music. Identifying a content type may comprise identifying whether the content type is suitable for a user to listen to while dozing and/or sleeping. In one example, identifying a content type may comprise identifying whether it comprises loud audio sections and/or sections of strobing or flashing lights. It may also comprise identifying a genre of the content, such as action, comedy, romance and/or sports.

An action to perform is a broad term that encompasses any action that a computing device may be programmed to take in response to receiving a sleep-state event. For example, it may comprise turning down the volume of a computing device, turning off the screen of a computing device and/or turning on or off a smart device that is communicably coupled to the computing device. In another example, it may comprise generating a bookmark to indicate a resume point of media content, or it may comprise turning off an automatic play function of an OTT application. In some examples, different actions may be performed based on the sleep stage of a user. For example, if it is identified that a user is dozing, gentle music may be played, or if it is identified that a user is asleep, a connected smart bulb may be turned off.

Data indicating a sleep stage may indicate that a user is in a light sleep or a deep sleep. In another example, the sleep stage may indicate whether a user is in rapid eye movement (REM) sleep or non-REM sleep and/or what sleep stage of non-REM sleep a user is in, for example, stage 1, stage 2 or stage 3. In another example, the sleep stage may indicate whether a user is in N1, N2, N3 or slow-wave sleep, delta sleep and/or deep sleep.

An application is any type of computer program that can run on a computing device. Where multiple applications are referred to in an embodiment, a single application may perform the task of two or more of the applications. Although many tasks described may be shown as taking place on a local computing device, such as a smart television, it is also contemplated that one or more of the tasks described herein may be performed on a server remote from the smart television. Tasks include receiving a sleep-state event, identifying a type of media, identifying an action to perform and generating the action to perform.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment in which a sleep-state event is received and responded to, in accordance with some embodiments of the disclosure. The environment comprises a computing device, in this example a smart television 100, that receives media content 102 via a network 104 from a server 106. The network 104 may be the internet and may comprise wired and/or wireless means for transmitting the media content 102 from the server 106 to the smart television 100. In some examples, the server 106 is an edge server. In some examples, the smart television 100 runs an application of an OTT provider in order to generate the media content 102 for output and to display the media content 102. If the computing device is, for example, a smart speaker and the media content is audio-only media content, then generating the media content for output may comprise generating a signal that causes a speaker to output the audio content. At least one user will typically consume the media content 102. In this example, the user is wearing a smartwatch 108 that, if the user falls asleep, generates a sleep-state event 109. In other examples, the user may have a smartphone that monitors whether a user is dozing and/or sleeping, and the smartphone may generate a sleep-state event if the user dozes and/or sleeps. In another example, the smart television may comprise one or more monitoring devices, such as a camera that uses image recognition to determine whether the user is awake or asleep. Any computing device that can recognize whether a user has started dozing and/or sleeping and that can transmit data indicating that the user has started dozing and/or sleeping may be used. The sleep-state event 109 is transmitted from the smartwatch 108 via wireless means, for example, via Wi-Fi and/or Bluetooth. In some examples, the sleep-state event may be transmitted via wired means. The sleep-state event 109 may comprise biometric data that the smart television 100 may analyze in order determine whether a user is dozing and/or asleep. An application running on the smart television 100 identifies a type of the media content 110 being streamed from the server 106. On receiving the sleep-state event 109, an application running on the smart television identifies an action to perform 112 based on the type of the media content. Once the action to perform has been identified, the smart television generates the action to perform 114 and may perform the action.

Figure 2:
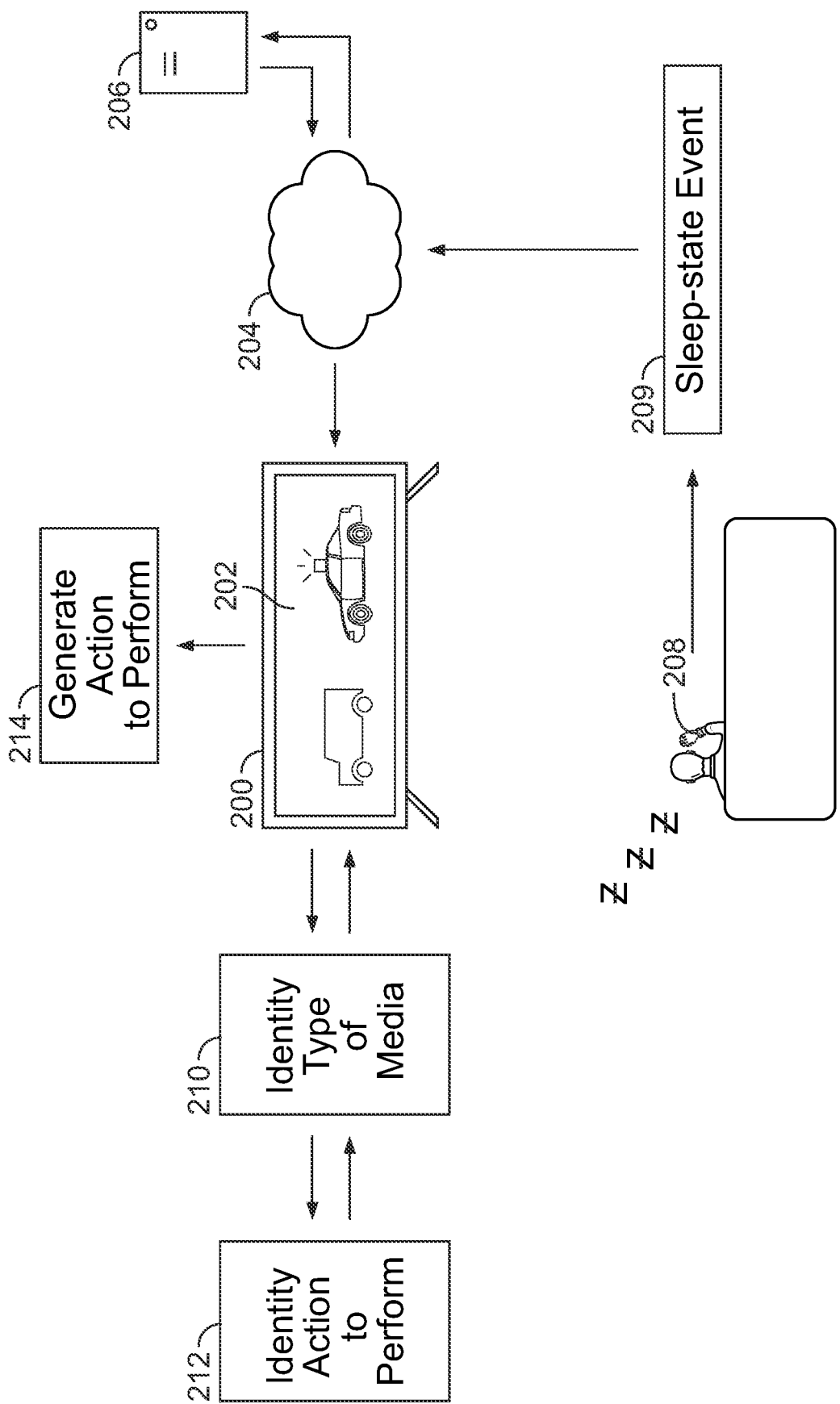
FIG. 2 shows another example environment in which a sleep-state event is received and responded to, in accordance with some embodiments of the disclosure.

FIG. 2 shows another example environment of which a sleep-state event is received and responded to, in accordance with some embodiments of the disclosure. In a similar manner to the environment shown in FIG. 1, the environment comprises a computing device, in this example a smart television 200, that receives media content 202 via a network 204 from a server 206. At least one user will typically consume the media content 202. In this example, the user is wearing a smartwatch 208 that monitors a user's biometric data; in this example the biometric data is heart rate data. The biometric data is transmitted from the smartwatch 208, via the network 204, to the server 206. As the heart rate data can be used to infer whether a user is sleeping, it is a sleep-state event 209. On receiving the heart rate data, an application running on the server 206 analyses the heart rate data to determine whether a user is dozing and/or sleeping. Although a single server 206 is shown, a first server may store and deliver the media content 202 to the smart television and a second server may receive and analyze the biometric data. On analyzing the heart rate data, if the application running on the server 206 identifies that a user has started dozing and/or sleeping, a sleep-state event 209 is sent from the server 206 to the smart television 200. As before, an application running on the smart television 200 identifies a type of the media content 210 being streamed from the server 206. On receiving the sleep-state event 209 from the server 206, an application running on the smart television identifies an action to perform 212 based on the type of the media content. Once the action to perform has been identified, an application running on the smart television generates the action to perform 214 and may perform the action. In some examples, the smartwatch 208 may analyze biometric data and/or user movement and generate a sleep-state event indicating that a user has fallen asleep and/or is dozing. This generated sleep-state event may be sent from the smartwatch 208, via the network 204 to the server 206. Based on the received sleep-state event, the server 206 may transmit a sleep-state event, via the network 204, to the smart television 200. In some examples, the identification of a type of media 210, the identification of an action to perform 212 and/or the generation of the action to perform 214 may also be performed at the server 206 and instructions may be transmitted from the server 206 to an application running on the smart television 200, via the network 204. For example, the server may send a command to an OTT platform to prevent auto play of the next episode in a series of episodes.

Figure 3:
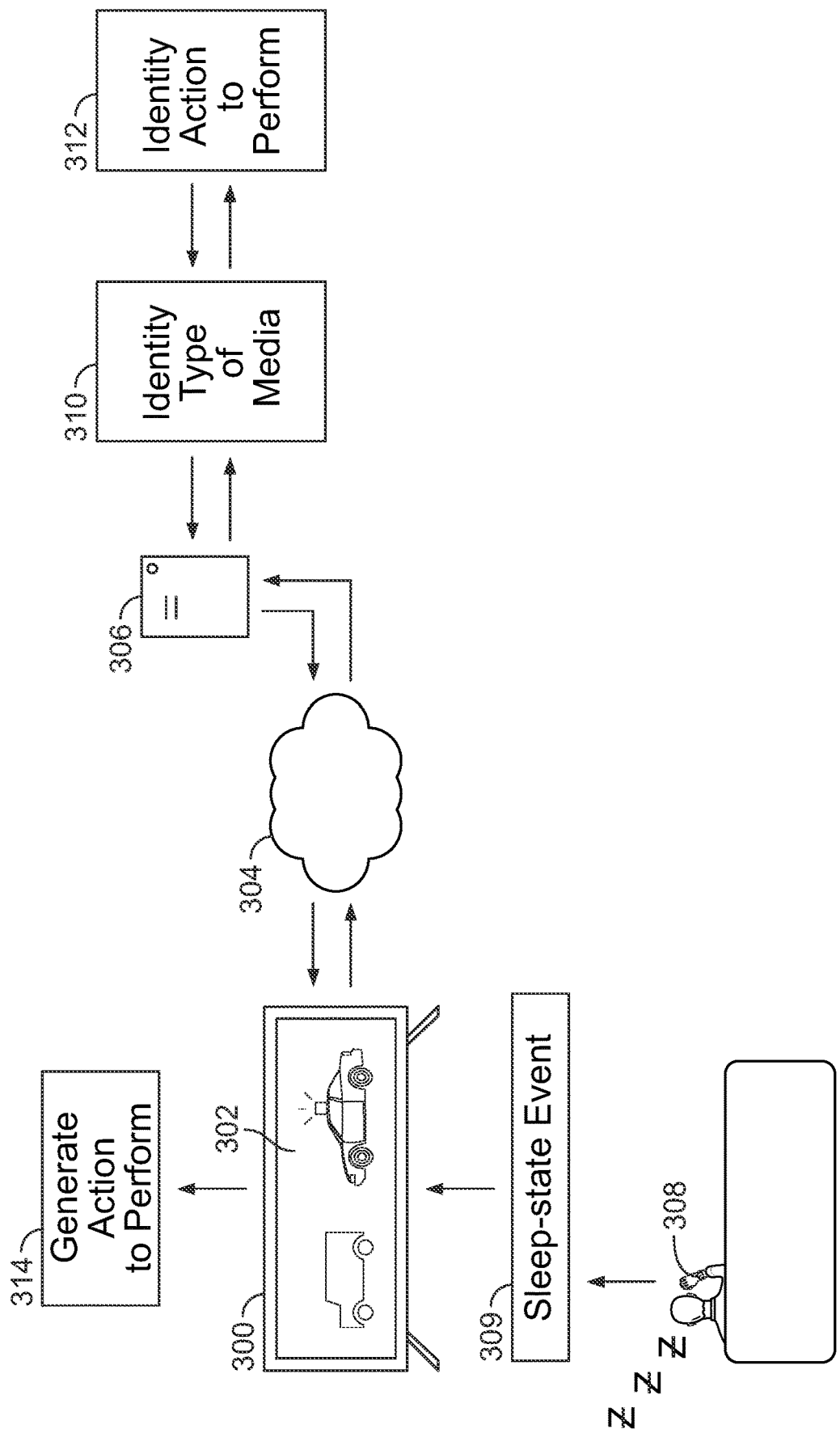
FIG. 3 shows another example environment in which a sleep-state event is received and responded to, in accordance with some embodiments of the disclosure.

FIG. 3 shows another example environment in which a sleep-state event is received and responded to, in accordance with some embodiments of the disclosure. In a similar manner to the previously discussed environments, the environment comprises a computing device, in this example a smart television 300, that receives media content 302 via a network 304 from a server 306. At least one user will typically consume the media content 302. In this example, the user is wearing a smartwatch 308 that, if the user falls asleep, generates a sleep-state event 309. The sleep-state event 309 is transmitted from the smartwatch 308, via wireless means, to the smart television 300. On receiving a sleep-state event 309, an application running on the smart television 300 may transmit this sleep-state event to the server 306 via the network 304. Although a single server 306 is shown, a first server may store and deliver the media content 302 to the smart television and a second server may receive and analyze the sleep-state event. On receiving the sleep-state event 309, an application running on the server may identify a type of the media content 310 being streamed from the server 306. An application running on the server also identifies an action to perform 312 based on the type of the media content. The identified action to perform is transmitted from the server 306, via the network 304, to the smart television 300. Once the action to perform has been received at the smart television 300, an application running on the smart television generates the action to perform 314 and may perform the action.

Figure 4:
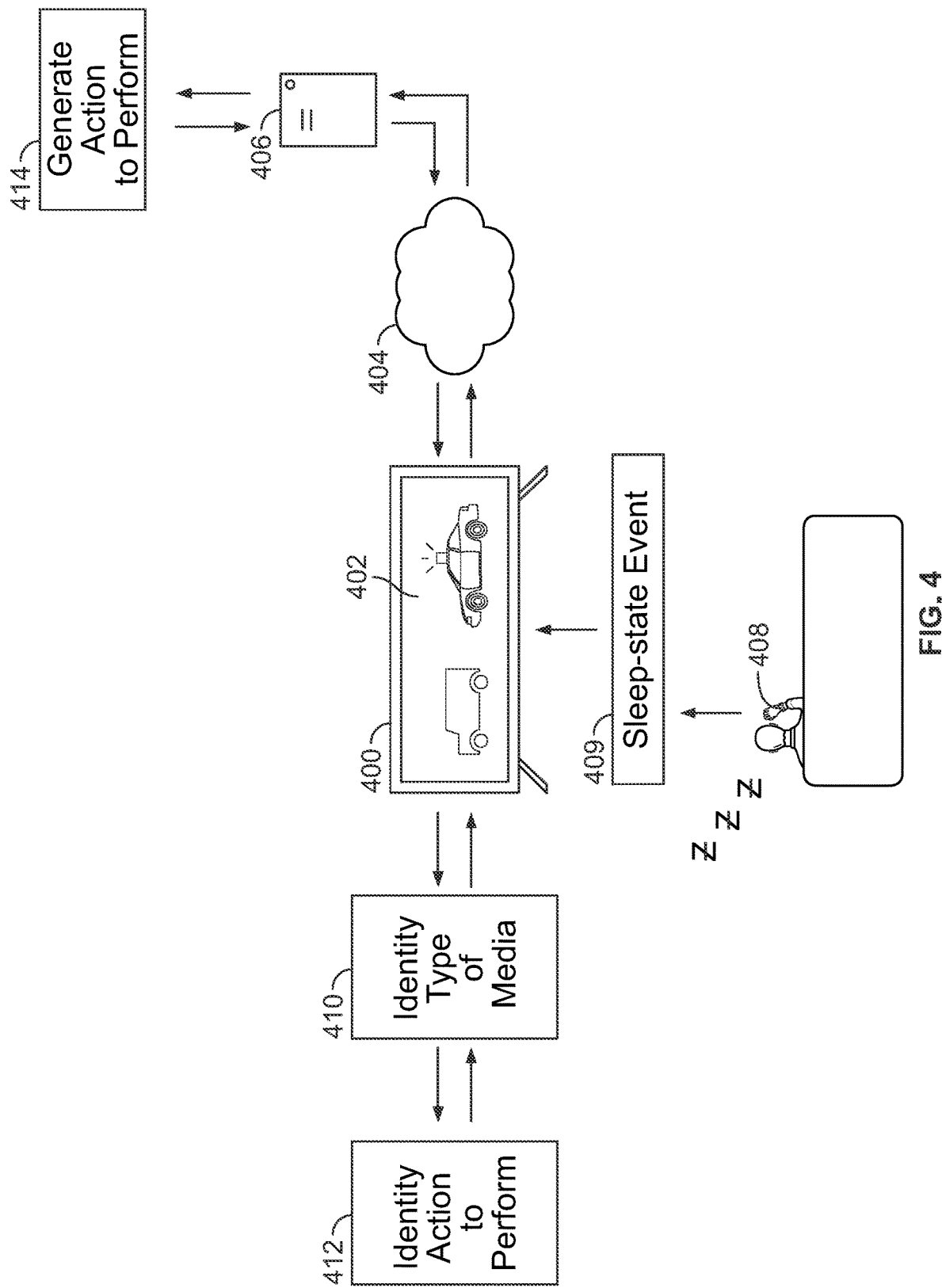
FIG. 4 shows another example environment in which a sleep-state event is received and responded to, in accordance with some embodiments of the disclosure.

FIG. 4 shows another example environment in which a sleep-state event is received and responded to, in accordance with some embodiments of the disclosure. In a similar manner to the previously discussed environments, the environment comprises a computing device, in this example a smart television 400, that receives media content 402 via a network 404 from a server 406. At least one user will typically consume the media content 402. In this example, the user is wearing a smartwatch 408 that, if the user falls asleep, generates a sleep-state event 409. The sleep-state event 409 is transmitted from the smartwatch 408, via wireless means, to the smart television 400. An application running on the smart television 400 identifies a type of the media content 410 being streamed from the server 406. On receiving the sleep-state event 409, an application running on the smart television identifies an action to perform 412 based on the type of the media content. The identified action to perform may be transmitted from the smart television 400, via the network 404, to the server 406. An application running on the server may generate the action to perform 414. The generated action may be performed at the server 406, for example a user profile that is stored on the server may be updated, or the action may comprise transmitting instructions to the smart television 400, for example to turn down the volume of the smart television 400.

Figure 5:
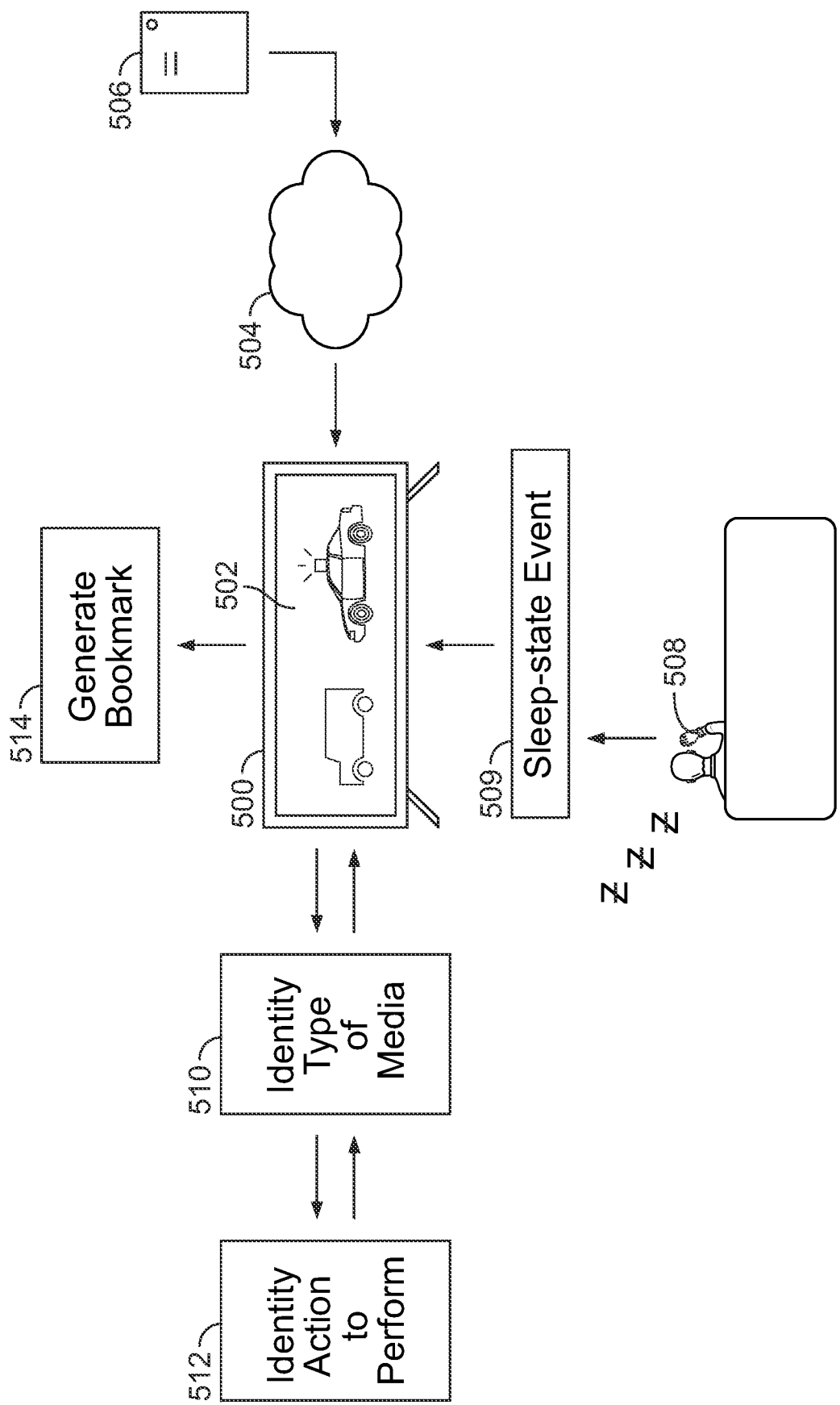
FIG. 5 shows another example environment in which a sleep-state event is received and responded to, in accordance with some embodiments of the disclosure.

FIG. 5 shows another example environment in which a sleep-state event is received and responded to, in accordance with some embodiments of the disclosure. In a similar manner to the previously discussed environments, the environment comprises a computing device, in this example a smart television 500, that receives media content 502 via a network 504 from a server 506. At least one user will typically consume the media content 502. In this example, the user is wearing a smartwatch 508 that, if the user falls asleep, generates a sleep-state event 509. The sleep-state event 509 is transmitted from the smartwatch 508 via wireless means, for example, via Wi-Fi and/or Bluetooth. An application running on the smart television 500 identifies a type of the media content 510 being streamed from the server 506. On receiving the sleep-state event 509, an application running on the smart television identifies an action to perform 512 based on the type of the media content. Once the action to perform has been identified, the smart television generates the action to perform, which in this case is to generate a bookmark 514, wherein the bookmark indicates a time stamp of the media content 502 based on the time that the sleep-state event 509 was received. An application running on the smart television 500 may perform the generated action. Alternatively, the generated action may be transmitted to a server via the network 504 and performed remote from the smart television 500.

Figure 6:
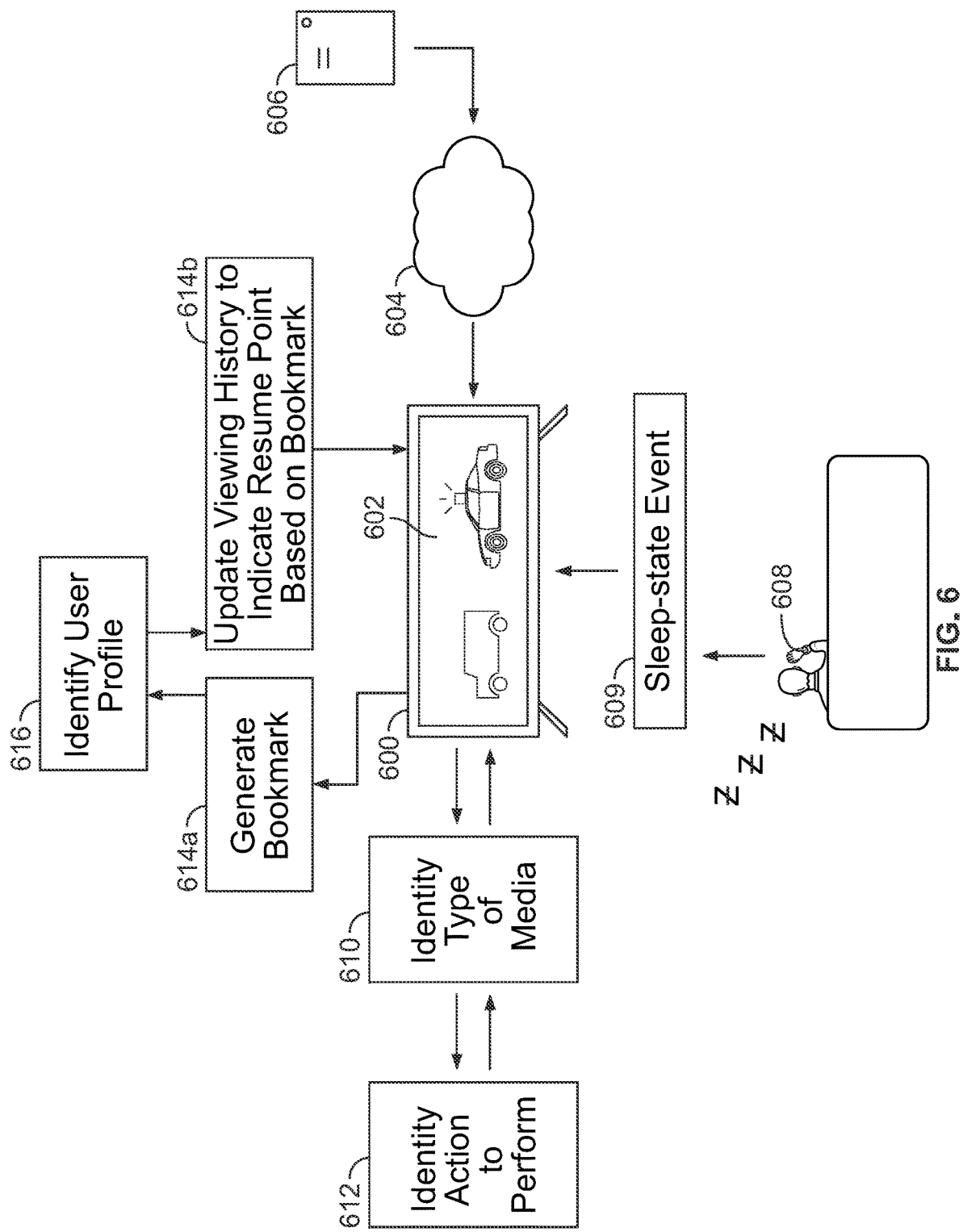
FIG. 6 shows another example environment in which a sleep-state event is received and responded to, in accordance with some embodiments of the disclosure.

FIG. 6 shows another example environment in which a sleep-state event is received and responded to, in accordance with some embodiments of the disclosure. In a similar manner to the previously discussed environments, the environment comprises a computing device, in this example a smart television 600, that receives media content 602 via a network 604 from a server 606. At least one user will typically consume the media content 602. In this example, the user is wearing a smartwatch 608 that, if the user falls asleep, generates a sleep-state event 609. The sleep-state event 609 is transmitted from the smartwatch 608 via wireless means, for example, via Wi-Fi and/or Bluetooth. An application running on the smart television 600 identifies a type of the media content 610 being streamed from the server 606. On receiving the sleep-state event 609, an application running on the smart television identifies an action to perform 612 based on the type of the media content. Once the action to perform has been identified, the smart television generates the action to perform. A first part of the generated action is to generate a bookmark 614a, wherein the bookmark indicates a time stamp of the media content 602 based on the time that the sleep-state event 609 was received. A user profile is identified 616; this may, for example, be the user profile that is used to log onto an OTT application running on the smart television 600. The second part of the generated action is to update a viewing history associated with the user profile to indicate a resume point 614b based on the generated bookmark 614a. An application running on the smart television 600 may perform the first and/or second parts of the generated action. Alternatively, the first and/or second parts of the generated action may be transmitted to a server via the network 604 and performed remote from the smart television 600.

Figure 7:
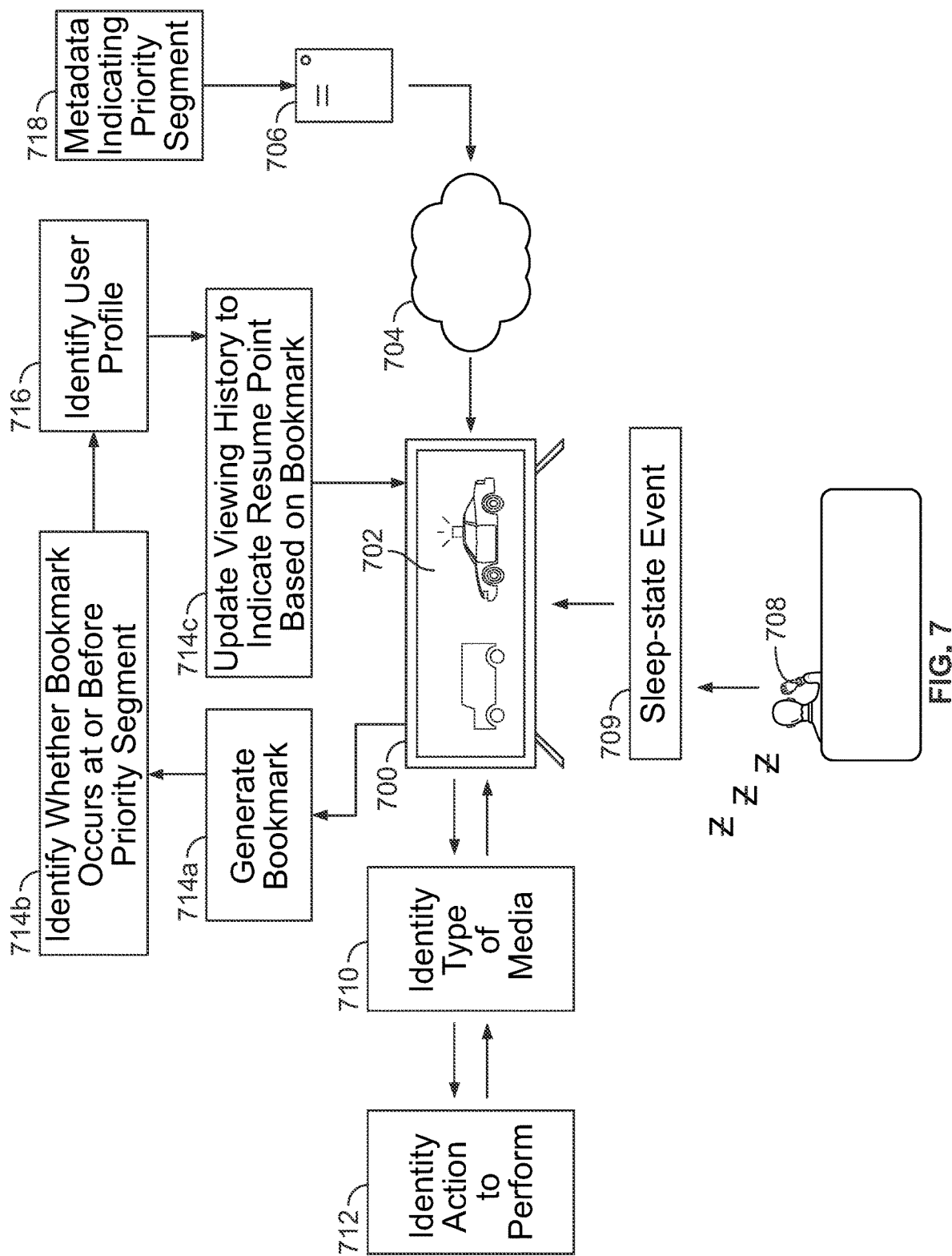
FIG. 7 shows another example environment in which a sleep-state event is received and responded to, in accordance with some embodiments of the disclosure.

FIG. 7 shows another example environment in which a sleep-state event is received and responded to, in accordance with some embodiments of the disclosure. In a similar manner to the previously discussed environments, the environment comprises a computing device, in this example a smart television 700, that receives media content 702 via a network 704 from a server 706. Metadata indicating a priority segment 718 is also stored at the server 706 and is transmitted to the smart television 700 via the network 704. The metadata may be transmitted concurrently with the media content 702. In another example, the metadata may be transmitted to the smart television on receiving a request from the smart television 700. In some examples, the metadata may be stored at a server that is different from the server 706 which stores and transmits the media content 702. At least one user will typically consume the media content 702. In this example, the user is wearing a smartwatch 708 that, if the user falls asleep, generates a sleep-state event 709. The sleep-state event 709 is transmitted from the smartwatch 708 via wireless means, for example, via Wi-Fi and/or Bluetooth. An application running on the smart television 700 identifies a type of the media content 710 being streamed from the server 706. On receiving the sleep-state event 709, an application running on the smart television identifies an action to perform 712 based on the type of the media content. Once the action to perform has been identified, the smart television generates the action to perform. The first part of the generated action is to generate a bookmark 714a, wherein the bookmark indicates a time stamp of the media content 702 based on the time that the sleep-state event 709 was received. A second part of the generated action is to identify whether the bookmark occurs at or before the priority segment 714b. This identification may comprise comparing a time stamp associated with when the bookmark event was generated and time stamps (i.e., a start time stamp and an end time stamp, defining a period) associated with when the priority segment is being output at the smart television 700. If the time stamp of the bookmark coincides with the priority period, then this condition is met. In another example, if the bookmark was generated before the priority period, then the condition may also be met as the generation of the bookmark infers that the user is asleep during the priority period. A user profile is identified 716; this may, for example, be the user profile that is used to log onto an OTT application running on the smart television 700. The third part of the generated action is to update a viewing history associated with the user profile to indicate a resume point 714c based on the generated bookmark 714a and the priority segment. For example, if the bookmark is generated during a priority segment, then the resume point may be the start of the priority segment. An application running on the smart television 700 may perform the first and/or second parts of the generated action. Alternatively, the first and/or second parts of the generated action may be transmitted to a server via the network 704 and performed remote from the smart television 700.

Figure 8:
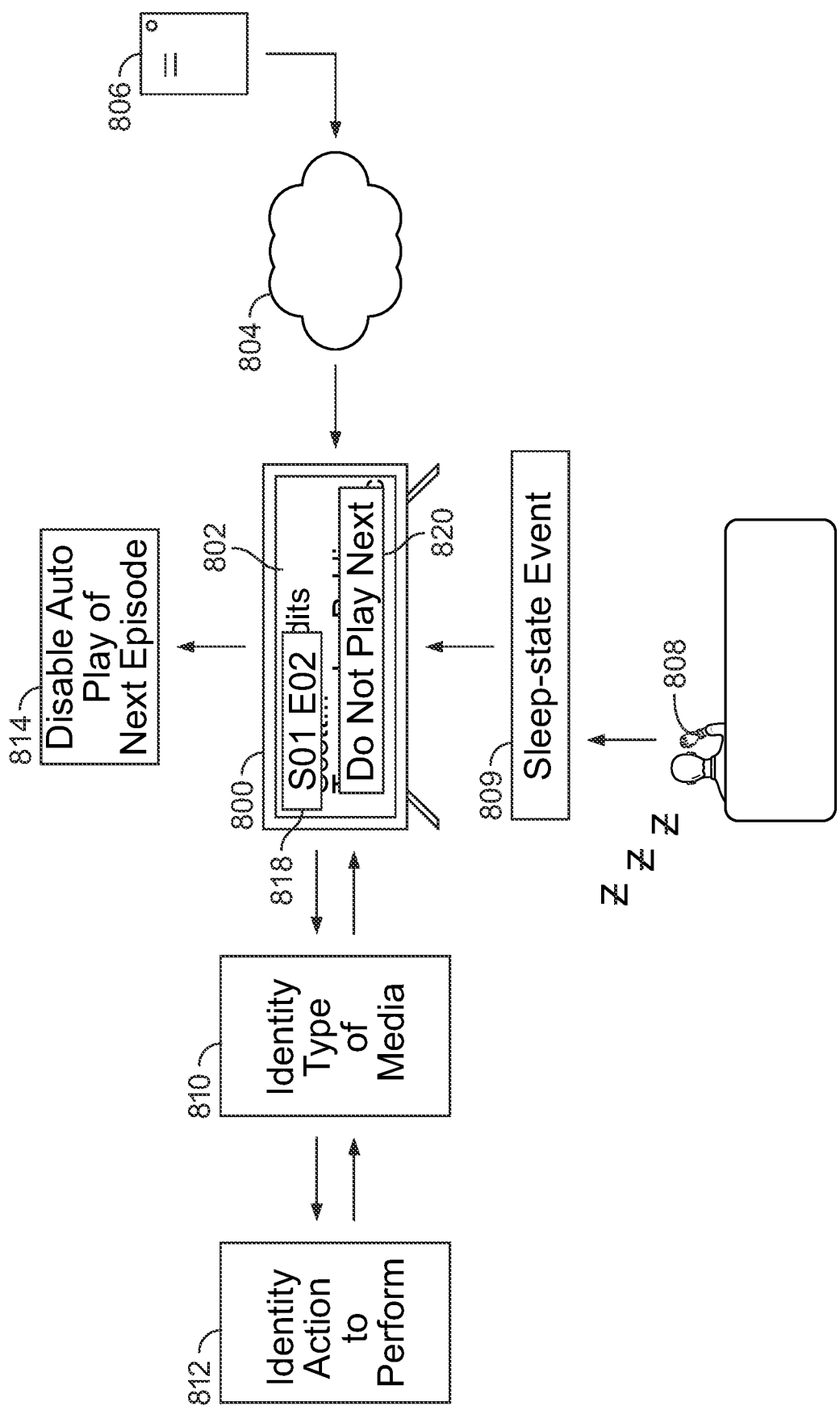
FIG. 8 shows another example environment in which a sleep-state event is received and responded to, in accordance with some embodiments of the disclosure.

FIG. 8 shows another example environment in which a sleep-state event is received and responded to, in accordance with some embodiments of the disclosure. In a similar manner to the previously discussed environments, the environment comprises a computing device, in this example a smart television 800, that receives media content 802 via a network 804 from a server 806. In this example, the media content 802 is an episode of a series of episodes. The smart television 800 may indicate that the media content 802 is an episode of a series of episodes by indicating a series and an episode number 818. At least one user will typically consume the media content 802, and typically once a user has finished an episode in a series of episodes, the subsequent episode will be generated for output. In this example, the user is wearing a smartwatch 808 that, if the user falls asleep, generates a sleep-state event 809. The sleep-state event 809 is transmitted from the smartwatch 808 via wireless means, for example, via Wi-Fi and/or Bluetooth. An application running on the smart television 800 identifies a type of the media content 810 being streamed from the server 806. On receiving the sleep-state event 809, an application running on the smart television identifies an action to perform 812 based on the type of the media content. Once the action to perform has been identified, the smart television generates the action, which in this case is to disable autoplay of the next episode 814. The smart television 800 may output an indication that the next episode will not be played by, for example, displaying a message "Do not play next" 820. A settings menu of an OTT application may enable a user to enable and/or disable this behavior.

Figure 9:
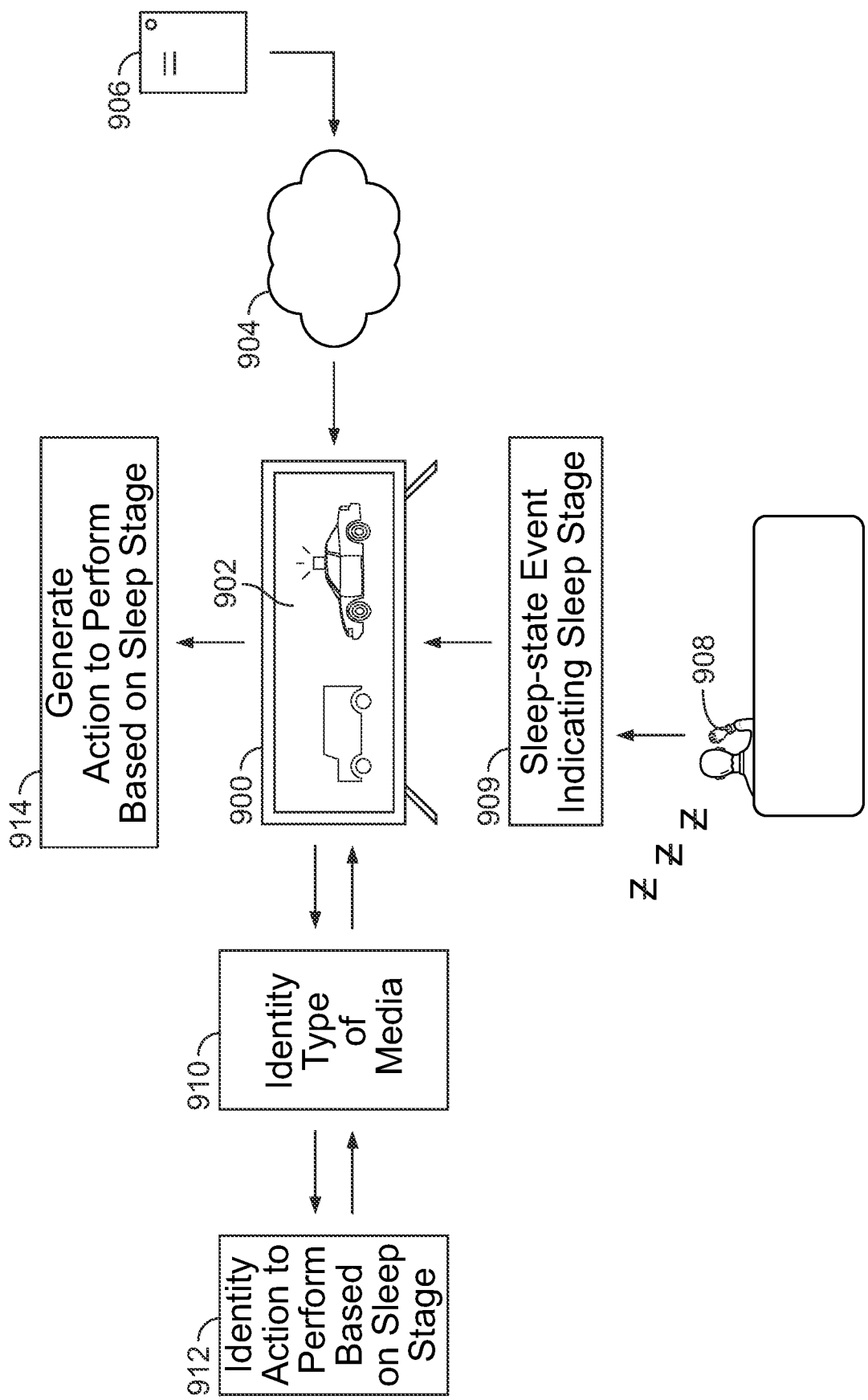
FIG. 9 shows another example environment in which a sleep-state event is received and responded to, in accordance with some embodiments of the disclosure.

FIG. 9 shows another example environment in which a sleep-state event is received and responded to, in accordance with some embodiments of the disclosure. In a similar manner to the previously discussed environments, the environment comprises a computing device, in this example a smart television 900, that receives media content 902 via a network 904 from a server 906. At least one user will typically consume the media content 902. In this example, the user is wearing a smartwatch 908 that, if the user falls asleep, generates a sleep-state event 909 that indicates a sleep stage of the user. The sleep-state event may indicate if a user is in a sleep stage comprising light sleep or a deep sleep. In another example, the sleep-state event may indicate whether a user is in a sleep stage comprising rapid eye movement (REM) sleep or non-REM sleep. The sleep-state event may indicate what sleep stage of non-REM sleep a user is in, for example stage 1, stage 2 or stage 3. In another example, the sleep-state event may indicate whether a user is in a sleep stage corresponding with N1, N2, N3 or slow-wave sleep, delta sleep and/or deep sleep. The sleep-state event 909 is transmitted from the smartwatch 908 via wireless means, for example, via Wi-Fi and/or Bluetooth. An application running on the smart television 900 identifies a type of the media content 910 being streamed from the server 906. On receiving the sleep-state event 909, an application running on the smart television identifies an action to perform 912 based on the type of the media content and the indicated sleep stage. For example, if the sleep-state event indicates that the user is in a light sleep, the media content may be changed to music that aids sleep. In another example, if the sleep-state event indicates that a user is in a deep sleep, the computing device may be turned off or switched to a standby mode. Once the action to perform 914 has been identified, the smart television generates the action to perform based on the indicated sleep stage.

Figure 10:
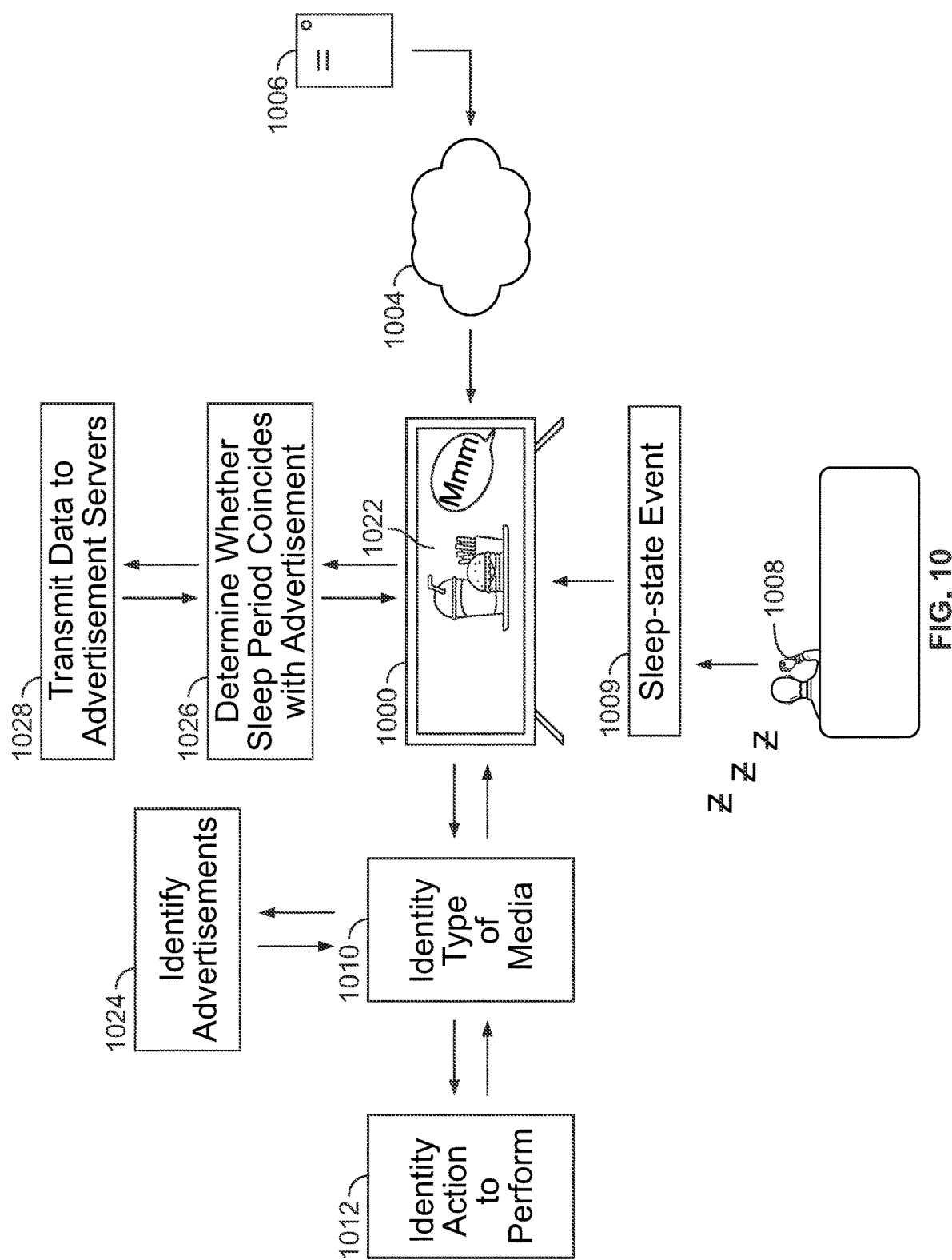
FIG. 10 shows another example environment in which a sleep-state event is received and responded to, in accordance with some embodiments of the disclosure.

FIG. 10 shows another example environment in which a sleep-state event is received and responded to, in accordance with some embodiments of the disclosure. In a similar manner to the previously discussed environments, the environment comprises a computing device, in this example a smart television 1000, that receives media content via a network 1004 from a server 1006. In this example, the media content comprises one or more advertisements 1022. The advertisements in this example are generated for display and output during the output of the media content. At least one user will typically consume the media content and advertisements. In this example, the user is wearing a smartwatch 1008 that, if the user falls asleep, generates a sleep-state event 1009. The sleep-state event 1009 is transmitted from the smartwatch 1008 via wireless means, for example, via Wi-Fi and/or Bluetooth. An application running on the smart television 1000 identifies a type of the media content 1010 being streamed from the server 1006. In addition to identifying the type of media 1010, it is determined whether the media content comprises one or more advertisements 1024. On receiving the sleep-state event 1009, an application running on the smart television identifies an action to perform 1012 based on the type of the media content. Once the action to perform has been identified, the smart television generates the action to perform, which in this case is to determine whether the sleep-state event coincides 1026 with the output of one or more advertisements 1022. For example, a time stamp associated with the sleep-state event may be compared to a time stamp associated with the output of one or more advertisements. If the time stamp of the sleep-state event is before or during the output of one or more advertisements, then this condition is met (i.e., that the user is asleep during the advertisements). If the sleep-state event coincides with the output of one or more advertisements 1022 then data indicating this is transmitted from the smart television 1000, via the network 1004, to an advertising server 1028. At the advertising server, it is determined whether the advertisement that the user missed due to sleeping should be output at the smart television 1000 at a later time. This may comprise re-transmitting the advertisement to the smart television 1000 or sending instructions to the smart television 1000 to temporarily store the advertisement in a cache. When a user accesses media content at the smart television 1000 at a later time, then one or more of the missed advertisements may be generated for output during (or at the beginning or the end of) the media content.

Figure 11:
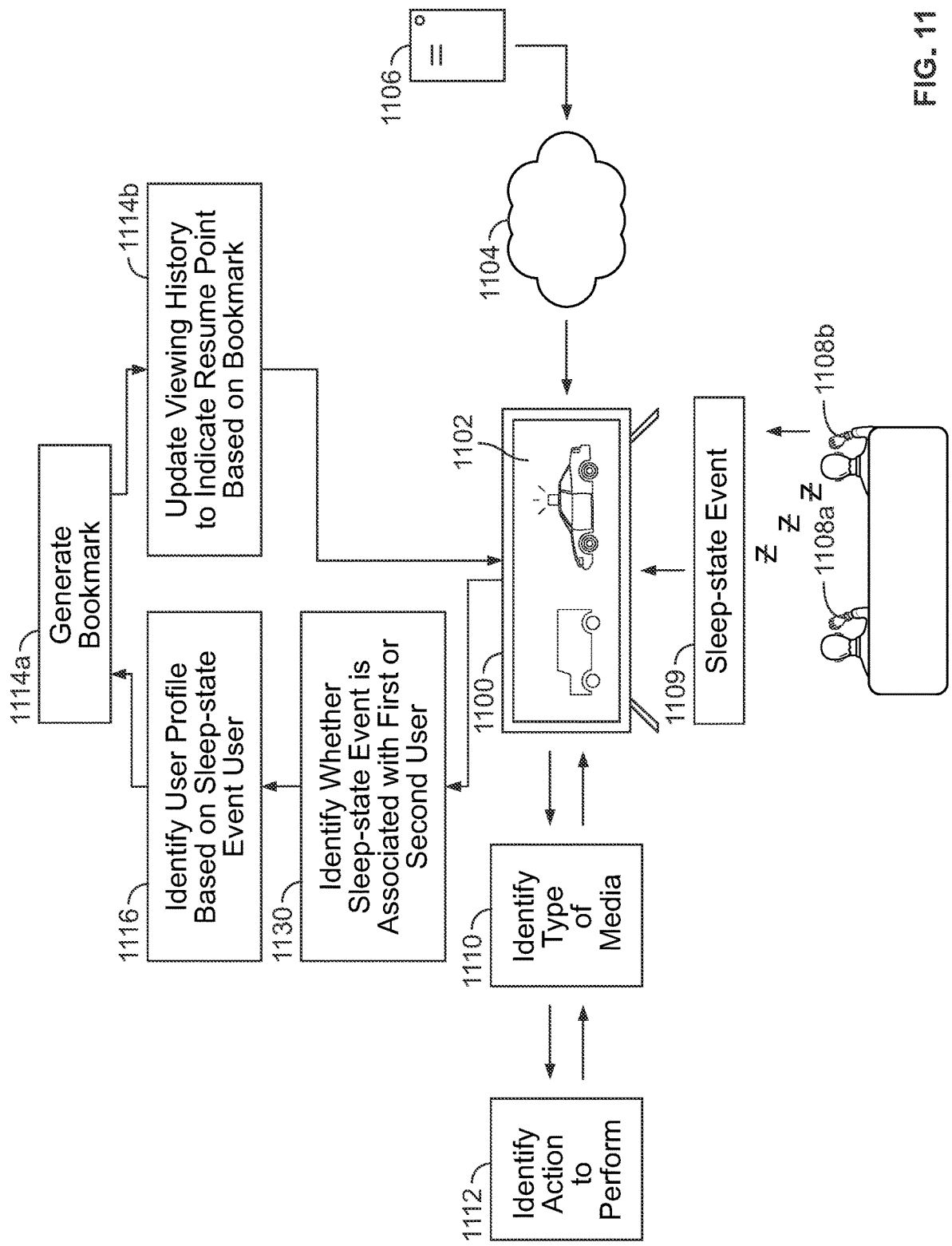
FIG. 11 shows another example environment in which a sleep-state event is received and responded to, in accordance with some embodiments of the disclosure.

FIG. 11 shows another example environment in which a sleep-state event is received and responded to, in accordance with some embodiments of the disclosure. In a similar manner to the previously discussed environments, the environment comprises a computing device, in this example a smart television 1100, that receives media content 1102 via a network 1104 from a server 1106. In this example, two users consume the media content 1102. Each of the users is wearing a smartwatch 1108*a*, 1108*b* that, if the user falls asleep, generates a sleep-state event 1109. In this example, the user wearing smartwatch 1108*b* falls asleep and the smartwatch 1108*b* generates a sleep-state event 1109 that is transmitted from the smartwatch 1108*b* via wireless means, for example, via Wi-Fi and/or Bluetooth. The smartwatch also transmits data that indicates the user to whom the sleep-state event pertains. An application running on the smart television 1100 identifies a type of the media content 1110 being streamed from the server 1106. On receiving the sleep-state event 1109, an application running on the smart television identifies an action to perform 1112 based on the type of the media content. Once the action to perform has been identified, the smart television identifies which user the sleep-state event is associated with 1130. This may be performed via data transmitted from the smartwatch 1108*b*. In another example, the user may be identified via a camera communicably connected to the smart television 1100 and an application running on the smart television 1100 may perform image recognition in order to identify which user is asleep. A user profile associated with the user that generated the sleep-state event 1109 is identified 1116. The smart television 1100 generates the action to perform. The first part of the generated action is to generate a bookmark 1114*a*, wherein the bookmark indicates a time stamp of the media content 1102 based on the time that the sleep-state event 1109 was received. The second part of the generated action is to update a viewing history associated with the identified user profile to indicate a resume point 1114*b* based on the generated bookmark 1114*a*.

Figure 12:
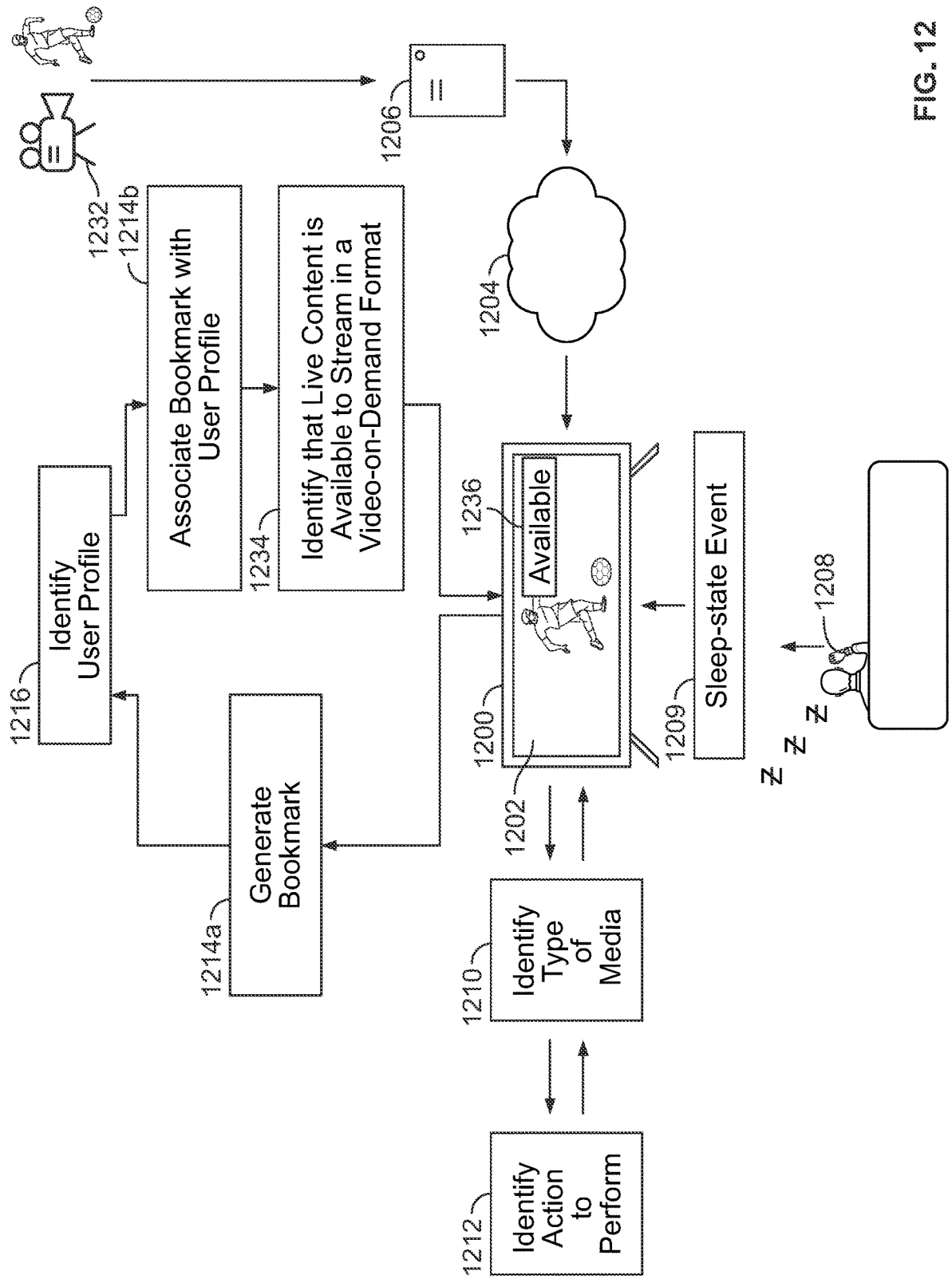
FIG. 12 shows another example environment in which a sleep-state event is received and responded to, in accordance with some embodiments of the disclosure.

FIG. 12 shows another example environment in which a sleep-state event is received and responded to, in accordance with some embodiments of the disclosure. In a similar manner to the previously discussed environments, the environment comprises a computing device, in this example a smart television 1200, that receives live media content 1202 via a network 1204 from a server 1206. The live content may be captured by a broadcaster with a video camera 1232. The capture is be transmitted from the video camera 1232 to the server 1206, where it is transmitted to the smart television 1200. At least one user will typically consume the media content 1202. In this example, the user is wearing a smartwatch 1208 that, if the user falls asleep, generates a sleep-state event 1209. The sleep-state event 1209 is transmitted from the smartwatch 1208 via wireless means, for example, via Wi-Fi and/or Bluetooth. An application running on the smart television 1200 identifies a type of the media content 1210 being streamed from the server 1206. On receiving the sleep-state event 1209, an application running on the smart television identifies an action to perform 1212 based on the type of the media content. Once the action to perform has been identified, the smart television generates the action to perform. The first part of the generated action is to generate a bookmark 1214*a*, wherein the bookmark indicates a time stamp of the media content 1202 based on the time that the sleep-state event 1209 was received. A user profile is identified 1216; this may, for example, be the user profile that is used to log on to an OTT application running on the smart television 1200. A second part of the generated action is to associate the bookmark with the identified user profile 1214*b*. A third part of the generated action is to identify that the live content is available to stream in a video-on-demand format 1234. Typically, this last step 1234 takes place when the user accesses the OTT platform at a later time. On identifying that the live content is available to stream in a video-on-demand format, an indicator 1236 is displayed to the user on the smart television 1200 indicating that the content is "available." For example, when the user next accesses the OTT platform, the OTT platform may already have an on demand format that is available for streaming. In this example, the indicator would be displayed to the when they access the OTT platform, or shortly after the user accesses the OTT platform. In another example, the on demand format may not be available for streaming when the user next accesses the OTT platform; however, it may be available at a subsequent time. For example, the on demand format may be available, for example, a period of time, such as a week or five months, after the user viewed the live media content. In this case, the indicator is displayed to the user when (or shortly after) they access the OTT platform and the on demand content is available. The indicator that is displayed to the user may be in the form of a recommendation, such as "would you like to watch this on demand content?" The indicator may also indicate a point at which the on demand content can be accessed, based on the bookmark that was generated when the sleep-state event was received. In some examples, the indicator may also enable a user to start watching the on demand content at the start. In other examples, a user may have a profile that is common to a plurality of OTT platforms. In this case, a user may watch live media content on a first platform and a bookmark based on a received sleep-state event may be generated and associated with their profile. On a second OTT platform, an indicator that indicates that an on demand format of the media content is available may be displayed to the user, based on the bookmark that is associated with their profile. A user may select this indicator to start streaming the media content. In addition, the media content may start streaming from a point based on the generated bookmark 1214*a*. For example, if the user fell asleep halfway though the live media content 1202, the video-on-demand content may start streaming at the halfway point.

Figure 13:
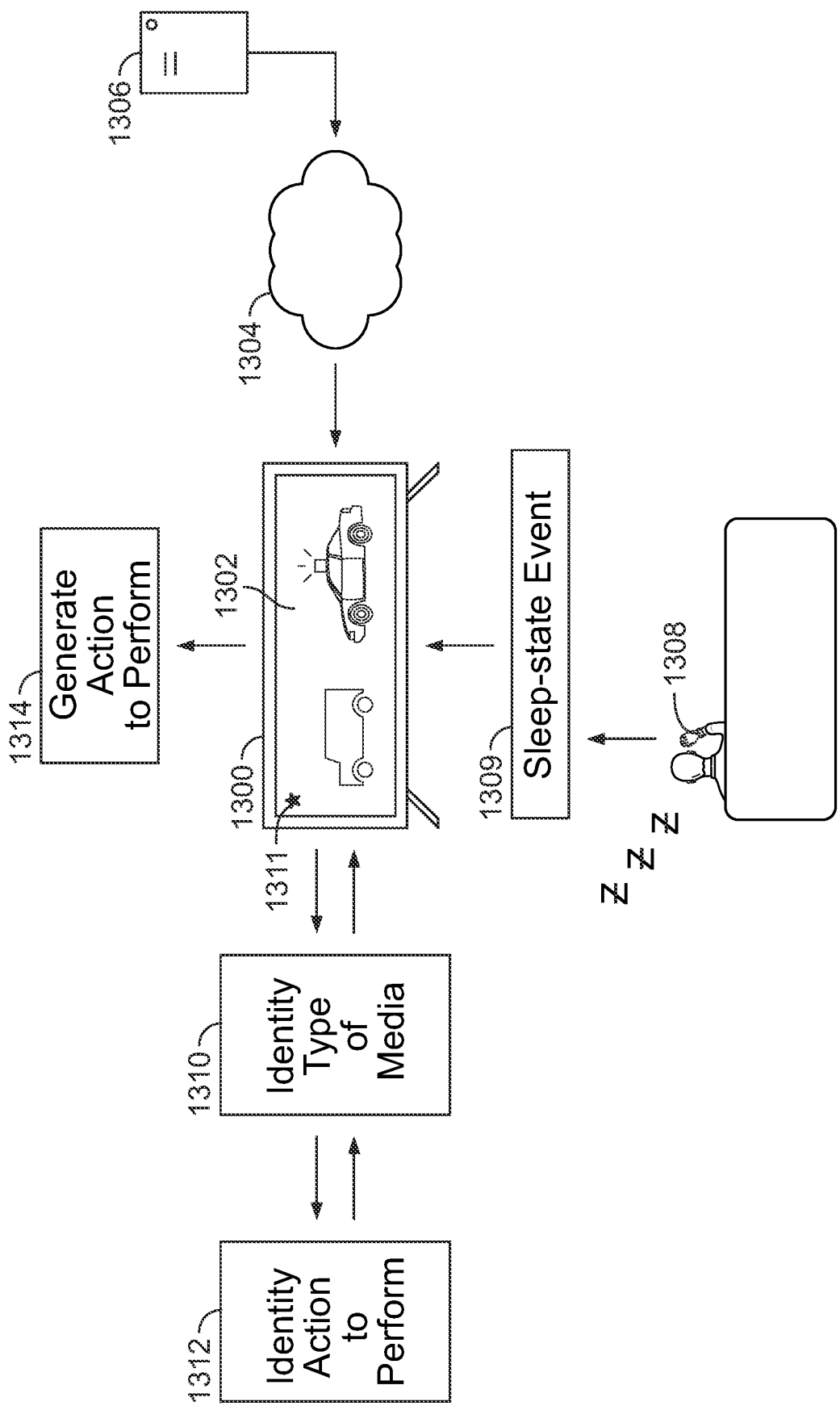
FIG. 13 shows another example environment in which a sleep-state event is received and responded to, in accordance with some embodiments of the disclosure.

FIG. 13 shows another example environment in which a sleep-state event is received and responded to, in accordance with some embodiments of the disclosure. In a similar manner to the previously discussed environments, the environment comprises a computing device, in this example a smart television 1300, that receives media content 1302 via a network 1304 from a server 1306. At least one user will typically consume the media content 1302. The user may indicate that the media content is favorite media content by selecting an icon via a remote control of the smart television 1300. In this example, the user has selected a star icon 1311 to indicate that the media content 1302 is a favorite media content item. In this example, the user is wearing a smartwatch 1308 that, if the user falls asleep, generates a sleep-state event 1309. The sleep-state event 1309 is transmitted from the smartwatch 1308 via wireless means, for example, via Wi-Fi and/or Bluetooth. An application running on the smart television 1300 identifies a type of the media content 1310 being streamed from the server 1306. In this example, the type of media content is favorited media content. On receiving the sleep-state event 1309, an application running on the smart television identifies an action to perform 1312 based on the type of the media content. Once the action to perform has been identified, the smart television generates the action to perform 1314 and may perform the action.

FIG. 14 shows pseudocode indicating the types of data that may be included in a sleep-state event, in accordance with some embodiments of the disclosure. A pseudo-function 1400 represents data that can be included in a sleep-state event that is transmitted from a first computing device, such as a smartwatch, to a second computing device, such as a smart television. The sleep-state event may indicate if a user has entered a sleep-state, or left a sleep-state (i.e., woken up) 1402. The sleep-state event may also comprise data that can be used to identify a user 1404. A time 1406 at which the user enters a sleep-state may be identified, as may a duration 1408 of the sleep-state. The sleep-state event may indicate a sleep stage 1410 of the user. The sleep-state event may also indicate a location 1412 of the user. This may comprise a room of a building, for example via a smart home network. In other examples, this may comprise co-ordinates, such as those used in conjunction with a global positioning satellite service, such as GPS. In any embodiment, multiple sleepstate events may be sent from the first computing device, such as a smartwatch, to a second computing device, such as a smart television, in order to update any of the aforementioned fields 1402, 1404, 1406, 1408, 1410, 1412.

Figure 15:
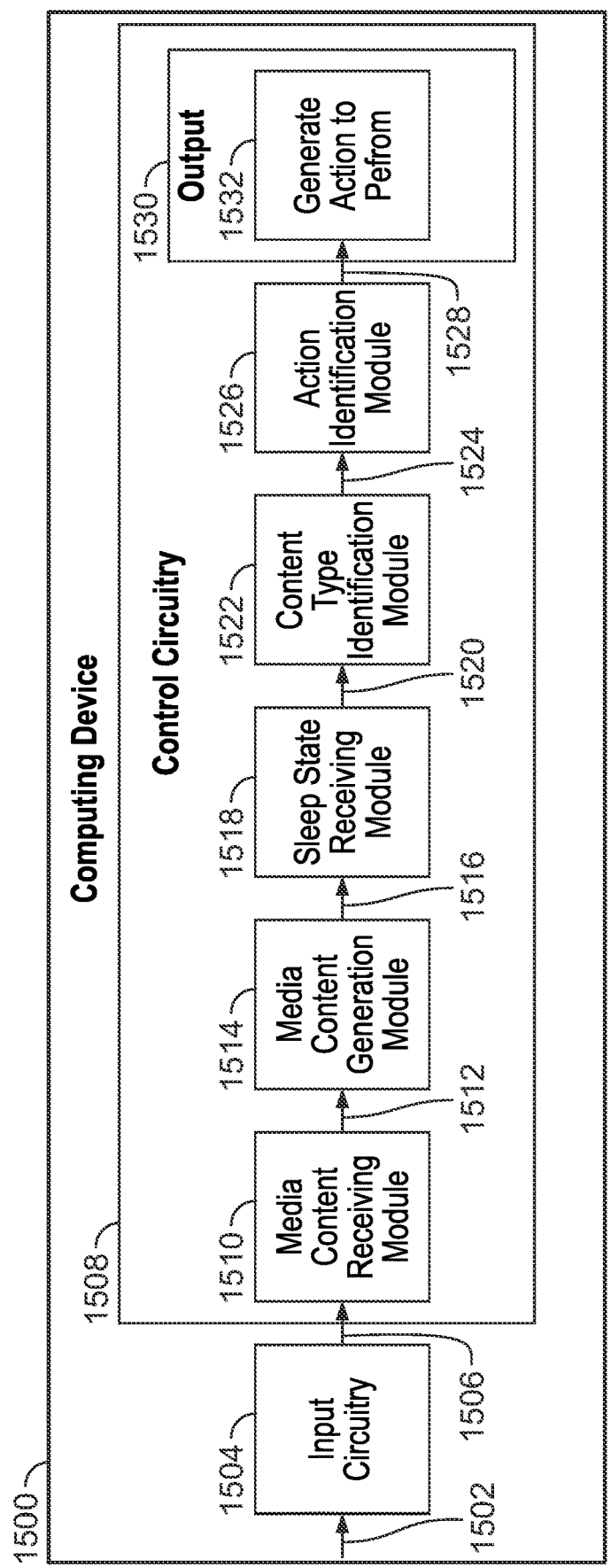
FIG. 15 shows a block diagram representing components of a computing device and data flow therebetween for responding to a sleep-state event, in accordance with some embodiments of the disclosure.

FIG. 15 shows a block diagram representing components of a computing device and data flow therebetween for responding to a sleep-state event, in accordance with some embodiments of the disclosure. Computing device 1500 (e.g., a smart television 100, 200, 300, 400, 500, 600, 700, 800, 900, 1000, 1100, 1200) as discussed above comprises input circuitry 1504, control circuitry 1508 and an output module 1530. Control circuitry 1508 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 1502 that is received by the input circuitry 1504. The input circuitry 1504 is configured to receive a user input related to a computing device. For example, this may be via a touchscreen, keyboard, mouse, microphone and/or infra-red controller of the computing device 1500. The input circuitry 1504 transmits 1506 the user input to the control circuitry 1508.

The control circuitry 1508 comprises a media content receiving module 1510, a media content generation module 1514, a sleep-state receiving module 1518, a content type identification module 1522, an action identification module 1526 and an output module 1530. The user input is transmitted 1506 to the media content receiving module 1510. At the media content receiving module 1510, media content is received. On receiving the media content, the media content is transmitted 1512 to the media content generation module 1514, where it is generated for output. A signal indicating that media content is being generated for output is transmitted 1516 to the sleep-state receiving module 1518, which receives a sleep-state event. On receiving a sleep-state event at the sleep-state receiving module 1518, the sleep-state event is transmitted 1520 to the content type identification module 1522, where the media content type is identified. The sleep-state event and an indication of the media content type is transmitted 1524 to the action identification module 1526, where an action to perform is identified. The action to perform is transmitted 1528 to the output module 1530, where the action to perform is generated 1532.

Figure 16:
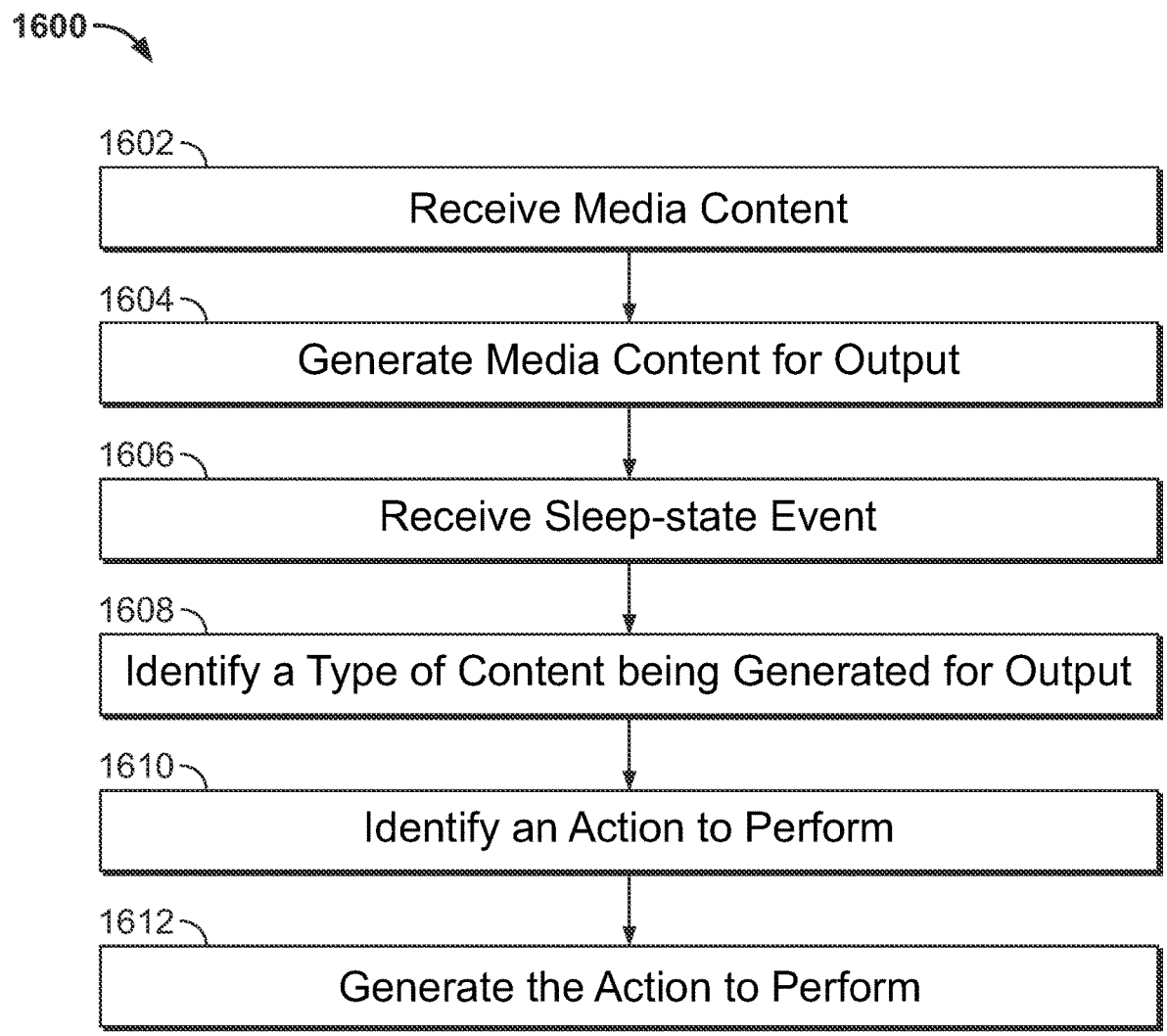
FIG. 16 shows a flowchart of illustrative steps involved in responding to a sleep-state event, in accordance with some embodiments of the disclosure.

FIG. 16 shows a flowchart of illustrative steps involved in responding to a sleep-state event, in accordance with some embodiments of the disclosure. Process 1600 may be implemented on any of the aforementioned computing devices (e.g., smart television 100, 200, 300, 400, 500, 600, 700, 800, 900, 1000, 1100, 1200). In addition, one or more actions of the process 1600 may be incorporated into or combined with one or more actions of any other process or embodiments described herein.

At 1602 media content is received, for example at a smart television, via a network, from a server. At 1604, the media content is generated for output, for example displayed at a smart television. At 1606, a sleep-state event is received, for example from a smartwatch, indicating that a user has fallen asleep. At 1608, a type of content being generated for output is identified. At 1610, an action to perform is identified. At 1612, the action to perform is generated.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of responding to a sleep-state event, the method comprising:
receiving, at a computing device, first media content;
generating for output, at the computing device, the first media content;
receiving a sleep-state event;
identifying a type of the first content being generated for output;
determining whether the first media content comprises one or more advertisements;
determining whether a sleep period that starts with the received sleep-state event coincides with one or more of the advertisements;
identifying, based on the type of the first media content, an action to perform in response to receiving the sleep-state event, wherein the action to perform comprises transmitting data to an advertisement server indicating that the sleep period coincided with one or more of the advertisements;
receiving, at the computing device, second media content;
receiving, at the computing device one or more of the advertisements that coincided with the sleep period; and
generating for output the second media content and the one or more advertisements.

2. The method of claim 1, wherein the action to perform comprises generating a bookmark in response to receiving the sleep-state event.

3. The method of claim 2, wherein:
a user profile is identified; and
the action to perform further comprises updating a viewing history associated with the identified user profile to indicate a resume point based on the generated bookmark.

4. The method of claim 3, wherein:
the first media content comprises metadata indicating a priority segment; and
the action to perform further comprises identifying whether the generated bookmark occurs at or before the priority segment, wherein the resume point is further based on a time stamp of the priority segment.

5. The method of claim 1, wherein:
the first media content is an episode of a series of episodes; and
the action to perform comprises disabling the automatic playing of a subsequent episode of the series of episodes.

6. The method of claim 1, wherein:
the sleep-state event comprises data indicating a sleep stage of a user; and
the action to perform is based on the sleep stage of the user.

7. The method of claim 1, wherein receiving the sleep-event comprises receiving a first sleep-event or receiving a second sleep-event, wherein the first sleep-event is associated with a first user and the second sleep-event is associated with a second user;
identifying, based on whether the sleep-event was received from the first user or the second user, a user profile associated with the first user or the second user; and
wherein the action to perform comprises generating a bookmark in response to receiving the sleep-state event and updating a viewing history associated with the identified user profile to indicate a resume point based on the generated bookmark.

8. The method of claim 1, wherein:
the first media content is live media content that is received in, at least substantially, real time;
the action to perform comprises generating a bookmark in response to receiving the sleep-state event;
and wherein the method further comprises:
identifying a user profile;
associating the bookmark with the user profile;
identifying that the live media content subsequently becomes available to stream in a video-on-demand format;
generating, for output, an indication that the first media content is available to stream in a video-on-demand format that indicates a start point of the video-on-demand media content based on the bookmark.

9. The method of claim 1, wherein the type of the first media content is a favorited media content item.

10. A system for responding to a sleep-state event, the system comprising:
a communication port;
a memory storing instructions; and
control circuitry communicably coupled to the memory and the communication port and configured to execute the instructions to:
receive, at a computing device, first media content;
generate for output, at the computing device, the first media content;
receive a sleep-state event;
identify a type of the first content being generated for output;
determine whether the first media content comprises one or more advertisements;
determine whether a sleep period that starts with the received sleep-state event coincides with one or more of the advertisements;
identify, based on the type of the first media content, an action to perform in response to receiving the sleep-state event, wherein the action to perform comprises transmitting data to an advertisement server indicating that the sleep period coincided with one or more of the advertisements;
receive, at the computing device, second media content;
receive, at the computing device one or more of the advertisements that coincided with the sleep period; and
generate for output the second media content and the one or more advertisements.

11. The system of claim 10, wherein the action to perform comprises generating a bookmark in response to receiving the sleep-state event.

12. The system of claim 11, wherein the control circuitry is further configured to identify a user profile and wherein the action to perform further comprises updating a viewing history associated with the identified user profile to indicate a resume point based on the generated bookmark.

13. The system of claim 12, wherein:
the first media content comprises metadata indicating a priority segment; and
the action to perform further comprises identifying whether the generated bookmark occurs at or before the priority segment, wherein the resume point is further based on a time stamp of the priority segment.

14. The system of claim 10, wherein:
the first media content is an episode of a series of episodes; and
the action to perform comprises disabling the automatic playing of a subsequent episode of the series of episodes.

15. The system of claim 10, wherein:
the sleep-state event comprises data indicating a sleep stage of a user; and
the action to perform is based on the sleep stage of the user.

16. The system of claim 10, wherein:
the control circuitry configured to receive the sleep-event is further configured to receive a first sleep-event or receive a second sleep-event, wherein the first sleep-event is associated with a first user and the second sleep-event is associated with a second user;
the control circuitry is further configured to identify, based on whether the sleep-event was received from the first user or the second user, a user profile associated with the first user or the second user; and
wherein the action to perform comprises generating a bookmark in response to receiving the sleep-state event and updating a viewing history associated with the identified user profile to indicate a resume point based on the generated bookmark.

17. The system of claim 10, wherein:
the control circuitry configured to receive the first media content is further configured to receive live media content that is received in, at least substantially, real time;
the action to perform comprises generating a bookmark in response to receiving the sleep-state event;
and wherein the control circuitry is further configured to:
identify a user profile;
associate the bookmark with the user profile;
identify that the live media content subsequently becomes available to stream in a video-on-demand format;
generate, for output, an indication that the first media content is available to stream in a video-on-demand format that indicates a start point of the video-on-demand media content based on the bookmark.

18. The system of claim 10, wherein the type of the first media content is a favorited media content item.

\* \* \* \* \*